(12) United States Patent
Jurkat et al.

(10) Patent No.: US 7,756,609 B2
(45) Date of Patent: Jul. 13, 2010

(54) WIND PARK WITH A PLURALITY OF WIND ENERGY PLANTS AND METHOD FOR THE OPERATION OF THE WIND PARK

(75) Inventors: Mark Jurkat, Norderstedt (DE); Ulrich Harms, Hamburg (DE)

(73) Assignee: Nordex Energy GmbH, Norterstedt (DE)

( * ) Notice: Subject to any disclaimer, the term of this patent is extended or adjusted under 35 U.S.C. 154(b) by 102 days.

(21) Appl. No.: 11/934,374

(22) Filed: Nov. 2, 2007

(65) Prior Publication Data
US 2009/0033097 A1 Feb. 5, 2009

(30) Foreign Application Priority Data
Aug. 2, 2007 (DE) .................. 10 2007 036 444

(51) Int. Cl.
*G05D 11/00* (2006.01)
(52) U.S. Cl. .................................... 700/286
(58) Field of Classification Search ............... 700/22, 700/286, 287, 288, 289, 290
See application file for complete search history.

(56) References Cited

U.S. PATENT DOCUMENTS

| | | | | |
|---|---|---|---|---|
| 6,724,097 | B1 * | 4/2004 | Wobben | 290/44 |
| 7,528,496 | B2 * | 5/2009 | Fortmann | 290/44 |
| 2002/0029097 | A1 * | 3/2002 | Pionzio et al. | 700/286 |
| 2005/0042098 | A1 * | 2/2005 | Wobben | 416/132 B |
| 2007/0108769 | A1 * | 5/2007 | Wobben | 290/44 |
| 2007/0124025 | A1 * | 5/2007 | Schram et al. | 700/287 |

FOREIGN PATENT DOCUMENTS

| | | |
|---|---|---|
| DE | 199 48 196 A1 | 5/2001 |
| DE | 10 2005 032 693 A1 | 5/2009 |

* cited by examiner

*Primary Examiner*—Albert DeCady
*Assistant Examiner*—Chad Rapp
(74) *Attorney, Agent, or Firm*—Vidas, Arrett & Steinkraus, P.A.

(57) ABSTRACT

A method for the operation of a wind park with a plurality of wind energy plants, which each one have one control unit at a time, which can control and/or adjust the wind energy plant in response to a received desired value for an electric variable, the method having the following steps: a higher order control calculates and/or receives a currently permitted maximum value for the electric variable which the wind park is allowed to provide, the higher order control determines a desired value for the electric variable for each wind energy plant and forwards the same to the wind energy plants, characterized in that the higher order control determines the desired value for each one of the wind energy plants depending on the currently maximum and/or minimum available values of all the wind energy plants.

24 Claims, 2 Drawing Sheets

WIND PARK WITH A PLURALITY OF WIND ENERGY PLANTS AND METHOD FOR THE OPERATION OF THE WIND PARK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind park with a plurality of wind energy plants, which each one have one control unit at a time, which can control and/or adjust the wind energy plant in response to a received desired value for an electric variable, in order to provide an actual value corresponding to the desired value. Also, the present invention is related to a method for the operation of such a wind park.

It is commonly known to limit the power delivered by a wind park by presetting a desired value. Such a situation can occur, for instance, when due to certain reasons the available power is not to be fed into the electric grid. Such a throttled operation of the wind park makes it necessary to provide an also throttled operation for at least some of the wind energy plants in the park, or to cut them off.

The present invention is based on the objective to provide a method for the operation of a wind park as well as such a wind park itself, in which the wind energy plants can be controlled by simple means in order to supply preset desired values for the wind park stably in a short time.

BRIEF SUMMARY OF THE INVENTION

The method according to the present invention is related to the operation of a wind park with a plurality of wind energy plants. Each wind energy plant has a control unit, which can control and/or adjust the wind energy plant in response to a received desired value for an electric variable in order to provide the desired value. Further, a higher order control is provided, which calculates and/or receives a currently permitted maximum value for the electric variable. The higher order control is also designated as wind park control and/or as park manager. For instance, the higher order control can calculate itself the maximum permitted value for the electric variable as a consequence of electric measurements on the grid connection point itself. The maximum permitted value of the electric variable can also be laid down in the higher order control as a constant value or as a time course plan. Alternatively or in support, the higher order, control can also receive the maximum permitted value for the electric variable. The higher order control determines a desired value for an electric variable for each wind energy plant and forwards the same to the control of the wind energy plant. According to the invention, the higher order control determines each desired value for the wind energy plant depending on the currently maximum and/or a currently minimum available value which the wind energy plant can generate. Thus, there is a distribution of the variable to be overall provided by the wind park, depending on what each individual wind energy plant can currently provide. The currently maximum or minimum available value can be related to a maximum or minimum available value, respectively, at a point of time or during a certain time period, respectively. The advantage of this procedure is that a distribution of the desired values inside of the wind energy plant is performed, which is not only depending on the number of the wind energy plants in the wind park, but can take into account selectively actual peculiarities of the wind energy plants in the wind park.

In a preferred extension of the method of the present invention, the higher order control determines each desired value for one of the wind energy plants depending on the currently maximum and/or, minimum available values of all the wind energy plants in the wind park, and the preset permitted value for the electric variable for the wind park. The particular advantage of this method is that not only the currently maximum available value of an individual plant is taken into account in the distribution of the desired values, but the currently maximum available values of all the wind energy plants of the wind park are taken into account in the desired value distribution.

In a particularly preferred embodiment, the desired value for a wind energy plant is determined by the higher order control as the maximum available value of the wind park, divided by the number of the wind energy plants in the wind park, weighted with the quotient of the currently maximum available value of the respective wind energy plant and the arithmetic mean of the currently maximum available values of all the wind energy plants. Thus, seen from a purely logical point of view, the desired value distribution takes place in two steps. In a first step, that variable is associated to the wind energy plant as the desired value which results in a uniform distribution to all the wind energy plants. In a second step, the desired value presetting for the wind energy plant determined in this way is weighted. In this, the weighting takes place via the current value, which is maximum available for the wind energy plant, divided by the arithmetic mean of the currently maximum available values of all the wind energy plants. Expressed in another form, this means that the desired value $$\hat{B}^i_{Soll}$$

for the wind energy plant i (i–1, ..., N) results as $$\hat{B}^i_{Soll} = B^i_{Soll,WA} * \frac{B^i_{max}}{\overline{B}_{max}},$$

wherein $B_{Soll,WA}$ is the variable which results from the division of the desired value preset for the wind park by the number N of the wind energy plants. $B_{max}^i$ indicates the currently maximum available value of the wind energy plant i, and $\overline{B}_{max}$ is the arithmetic mean of the currently maximum available values of the electric variable of the wind energy plants. For instance, the arithmetic mean is calculated as $$\overline{B}_{max} = \frac{1}{N} \sum_{i=1}^{N} B^i_{max}$$

From the weighting $B_{max}^i / \overline{B}_{max}$ it becomes directly clear that a wind energy plant which can provide a higher than average value receives a higher desired value presetting than a wind energy plant which can only provide a lower than average value.

A peculiarity in this method is that it can also be applied to a cut-off wind energy plant without particular measures, when the maximum available value of zero is assigned to the same. A further peculiarity of the method is that the desired values for each wind energy plant are calculated when the currently maximum available value of all the wind energy plants is smaller than or equal to the currently maximum permitted value of the wind park. Thus, there is also a distribution through the assignment of desired values even when the wind park does not exploit the currently maximum available value of the wind park. By presetting desired values for the individual wind energy plants even in this condition, it can be made certain that the wind park can be rapidly limited to the maximum permitted desired value of the wind park without too great control- or adjustment interventions, at increasing wind velocity for instance.

In a preferred embodiment, the desired values for each wind energy plant are also calculated, when the currently maximum available value of all the wind energy plants is greater than or equal to the maximum permitted value of the wind park. This is the case when there is a limitation of the electric variable for individual wind energy plants, in order not to exceed the maximum permitted value.

In a preferred embodiment of the method of the present invention, when the desired value of one of the wind energy plants exceeds a limiting value, the desired value is limited to this limiting value. Just in a situation in which the desired value preset for the wind park is greater than the sum of the values which the individual wind energy plants can provide, the case may occur that a desired value for more than 100 percent with respect to the maximum available value is assigned to an individual wind energy plant. In this case, the desired value preset to the control of the wind energy plant is limited to a limiting value. Preferably, in this situation the portion not assigned to this wind energy plant can be distributed over the remaining wind energy plants. For the distribution of the desired values, the method of the present invention can be used again, wherein that wind energy plant of which the desired value has already set to the limiting value is then not taken into account in the distribution.

According to the present invention, a characteristic curve is provided for each one of the wind energy plants, in which the maximum available value of the assigned wind energy plant is laid down depending on one or plural external variables. The external variable may be a matter of the wind velocity and/or the wind direction, for instance. Then, the characteristic curve indicates for a preset wind velocity which amount the wind energy plant can maximally provide at this wind velocity. Based on the maximum available values determined from the characteristic curve, the assignment of the desired values takes then place.

The electric variable which is distributed in the wind park in the method of the present invention can be the active power and/or the active current of the wind energy plant. Alternatively, it is also possible to take the reactive power and/or the reactive current and/or the apparent power and/or the apparent current and/or a phase angle and/or a power factor as the electric variable.

In a preferred embodiment, an uniform or individual minimum available value is preset as the minimum desired value for some or all the plants. The minimum desired value is always used as the desired value for the corresponding wind energy plant when the desired value determined by the higher order control is smaller than the minimum available value. This makes certain that no too small desired value is assigned to a wind energy plant, which might lead to an increased wear in this wind energy plant, for instance. In addition, it may be provided that when the desired value for at least one wind energy plant is limited to the minimum available value, the desired value of at least one of the other wind energy plants is decreased. Purposefully, the decreased desired value is retained, as long as the minimum desired value is applied to the at least one wind energy plant.

The wind park of the present invention has a plurality of wind energy plants, which each one have one control unit at a time, in order to control and/or adjust the wind energy plant in response to a received desired value for an electric variable in order to achieve the desired value. In the wind park, a higher order control is provided which can store a maximum permitted value for the electric variable which the wind park is allowed to generate. The maximum permitted value which can be stored in the higher order control can be calculated or received by the higher order control. Also, the maximum permitted value of the electric variable can be laid down in the higher order control as a constant value or as a timing plan. In addition, the higher order control can determine a desired value of the electric variable for each wind energy plant and it can forward this determined desired value to the control of the wind energy plant. The higher orders control can determine a desired value for each wind energy plant, which is depending on the currently maximum available values of the wind energy plants in the wind park. A wind park equipped with the higher order control of the present invention can react to desired value presettings for the wind park without great delay and in a short time.

In a preferred extension of the wind park, the higher order control can determine each desired value for one of the wind energy plants depending on the maximum available values of all the wind energy plants in the wind park and the preset permitted value for the electric variable.

Particularly preferred, the higher order control can determine the desired value for a wind energy plant as the currently maximum available value of the wind park, divided by the number of the wind energy plants, weighted with the quotient of the currently maximum available value of the corresponding wind energy plant and the arithmetic mean of all the currently maximum available values of the wind energy plants. In the case in which the desired value presetting for the wind park is above the actual value of the electric variable generated by the wind park, as well as in the case where the variable generated by the wind park does not reach the desired value for the wind park, a higher order control realised in this manner can make certain that an individual desired value is assigned to each wind energy plant, which takes into account which contribution the wind energy plant can provide for achieving the desired value for the wind park. In a preferred embodiment, one characteristic curve is provided at a time either in the higher order control and/or in the controls of the wind energy plant, in which the maximum available value of the assigned wind energy plant can be laid down depending on one or several external variables. Such a characteristic curve offers the possibility to determine the maximum available value of the assigned wind energy plant by means of the laid-down values of an external variable, like the wind velocity and/or the wind direction for instance.

The active power is preferably provided as the electric variable for which a desired value can be preset in the wind park. Alternatively, it also possible to have the apparent power, the reactive power and/or the reactive current or a phase angle and/or a power angle as the electric variable.

In a preferred extension of the wind park, minimum desired values can be assigned to individual wind energy plants or all the wind energy plants. A minimum desired value has the function, for instance, to avoid increased wear of the wind energy plant. The minimum desired values are observed by the higher order control and an incidental desired value, which is smaller than the minimum desired value, is set to the minimum desired value. In this case, the desired value of another wind energy plant can be decreased in addition, preferably as long as a minimum desired value is preset.

BRIEF DESCRIPTION OF THE SEVERAL VIEWS OF THE DRAWINGS

In the following, the present invention is explained in more detail by means of two examples.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated For the realisation example, a wind park with three wind energy plants WT1, WT2 and WT3 is assumed, which deliver the produced active power via a power cable to a transmission grid. In the regular condition, such a wind park is operated without power limitation. However, circumstances may occur in which not the entire available active power of the wind energy plant is allowed to be fed into the transmission grid, so that the wind park has to be operated in a throttled manner. It is assumed that a wind park control is provided for this purpose.

The wind park control can be present as a control unit. The function of the wind park control can also be realised through the cooperation of several distributed controls.

In the case that the power of the wind energy plant has to be reduced, the wind park control receives a variable which indicates which power is currently permitted to be fed into the transmission grid. For the sake of simplicity, it is assumed that the signal for power reduction is expressed as a percentage, wherein the power value then results through the application of the percentage to the rated power. When the rated power of the wind energy plant is 6.28 MW, a power reduction to 80 percent means that the wind park is permitted to feed 6.28× 0.8 MW=5.02 at maximum.

Besides to the mentioned case that a desired value is preset to the wind park from an external side, the case may also occur that due to deviations from regular magnitudes occurred in the grid, the wind park generates a desired value independently or a predetermined desired value is laid down in the wind park control.

Further, a characteristic curve is provided for each one of the wind energy plants, which indicates the power that can be generated by the wind energy plant as a function of the wind velocity. This means that also the maximum available power of the wind energy plant can always be calculated for an actually measured wind velocity. In the following, this power is designated as $P_{max}^{i}$ (i=1, 2, 3).

The expression "maximum value" is not necessarily applied to a peak value of the plant, but the maximum value designates a value averaged over a time interval, which can also be fallen below or exceeded for a short time.

EXAMPLE 1

It is assumed that the power of the wind park to be provided is to be reduced to 30 percent. Further, it is assumed that the maximum available power is 100 percent for the wind energy plant 1, hence, the wind conditions are sufficient for operating the plant with its rated power. In contrast to this, wind energy plants 2 and 3 can provide only 30 and 50 percent of their rated power.

Figure 1:
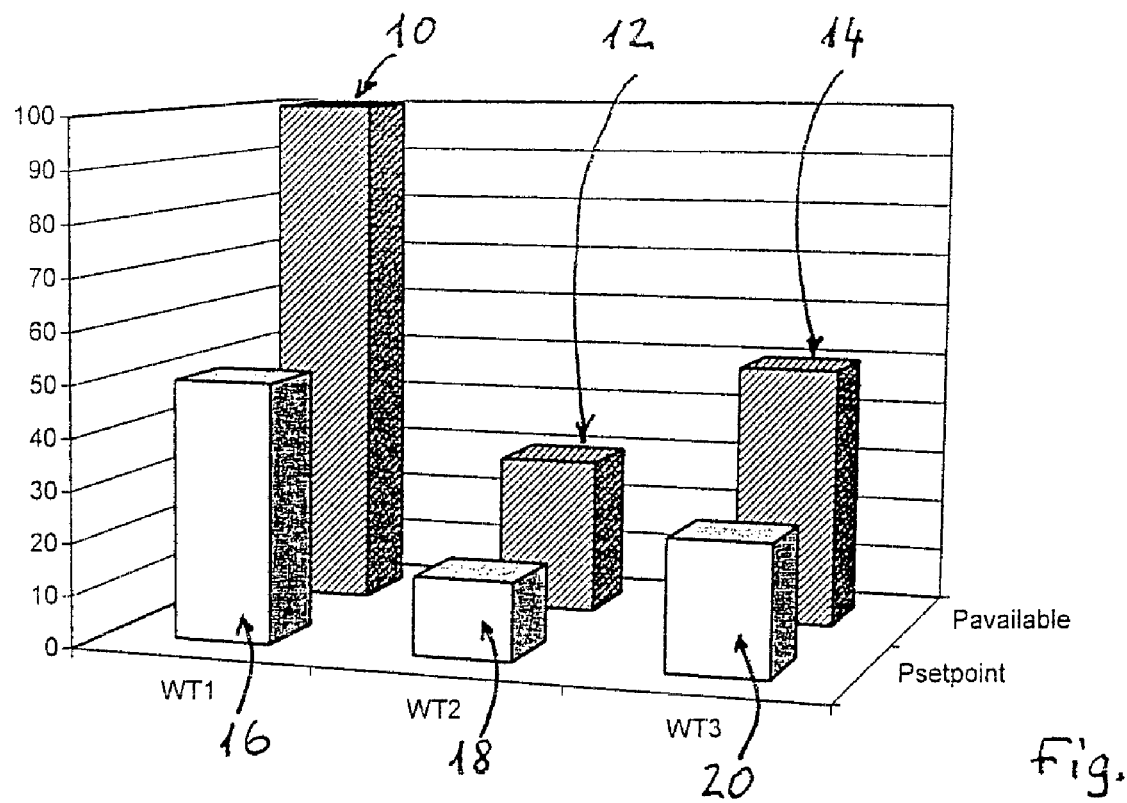
FIG. 1 shows the power distribution of three wind energy plants at a significant power reduction.

In FIG. 1, the maximum available power from the wind energy plants WT1 to WT3 is represented in the rear column row, wherein column 10 indicates a value of 100 percent, column 12 a value of 30 percent and column 14 represents a value of 50 percent. In a next step, the arithmetic mean of the maximum available power per plant is calculated now. The same results in the example as follows:

$$\overline{P}_{max} = \frac{(100\% + 30\% + 50\%)}{3} = 60\%$$

This magnitude indicates the value which the individual wind energy plants are able to provide in the average. In this calculation, it was assumed that each wind energy plant in the wind park has exactly the same rated power. In the case of a heterogeneous wind park, in which the individual wind energy plants have different rated powers, the individual rated powers have to be taken into account in the calculation of the arithmetic mean for the average available power which can be supplied.

In the following, desired values are assigned to each wind energy plant WT1, . . . WT3 as follows:

$$\hat{P}_{max}^{1} = 30\% * \frac{100\%}{60\%} = 50\%$$

$$\hat{P}_{max}^{2} = 30\% * \frac{30\%}{60\%} = 15\%$$

$$\hat{P}_{max}^{3} = 30\% * \frac{50\%}{60\%} = 25\%$$

In the example, the desired value to which the power is to be limited, thus, the 30-% value, is in each case weighted with the currently maximum available power value of the wind energy plant, divided through the average currently available power value per wind energy plant.

Altogether, with the present results for the power distribution it can be clearly recognised that each one of the plants is operated with a throttled value, and can react to fluctuating wind values without problems through this.

EXAMPLE 2

In the following example, it is assumed that the desired value limitation is to be 80 percent. Further, it is assumed again that the individual wind energy plants have 100 percent, 30 percent and 50 percent as the available power values again. Applying the calculation scheme from example 1 again, the following values for the desired value presettings of the individual wind energy plants result:

$$\hat{P}_{max}^1 = 80\% * \frac{100\%}{60\%} = 133\%$$

$$\hat{P}_{max}^2 = 80\% * \frac{30\%}{60\%} = 40\%$$

$$\hat{P}_{max}^3 = 80\% * \frac{50\%}{60\%} = 66\%$$

With the example it becomes clear that with this moderate power limitation and the available power of the wind park, desired values for the individual wind energy plants result which cannot be provided.

Figure 2:
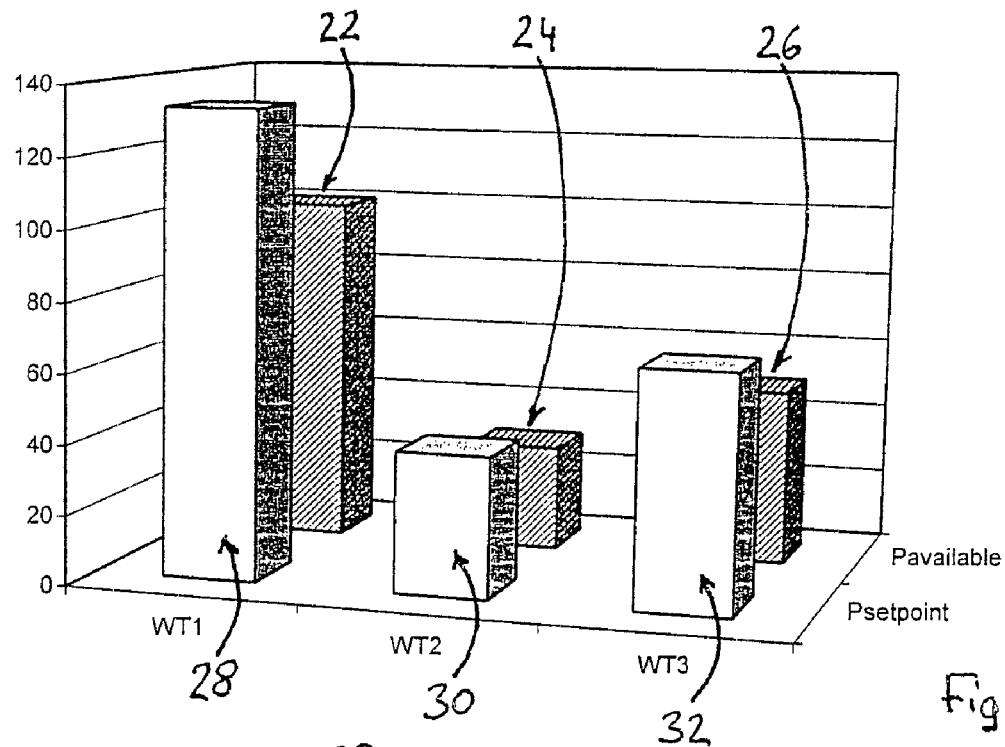
FIG. 2 shows an intermediate result in the power distribution, wherein the current desired value of a wind energy plant is above the limiting value of this wind energy plant.
Figure 3:
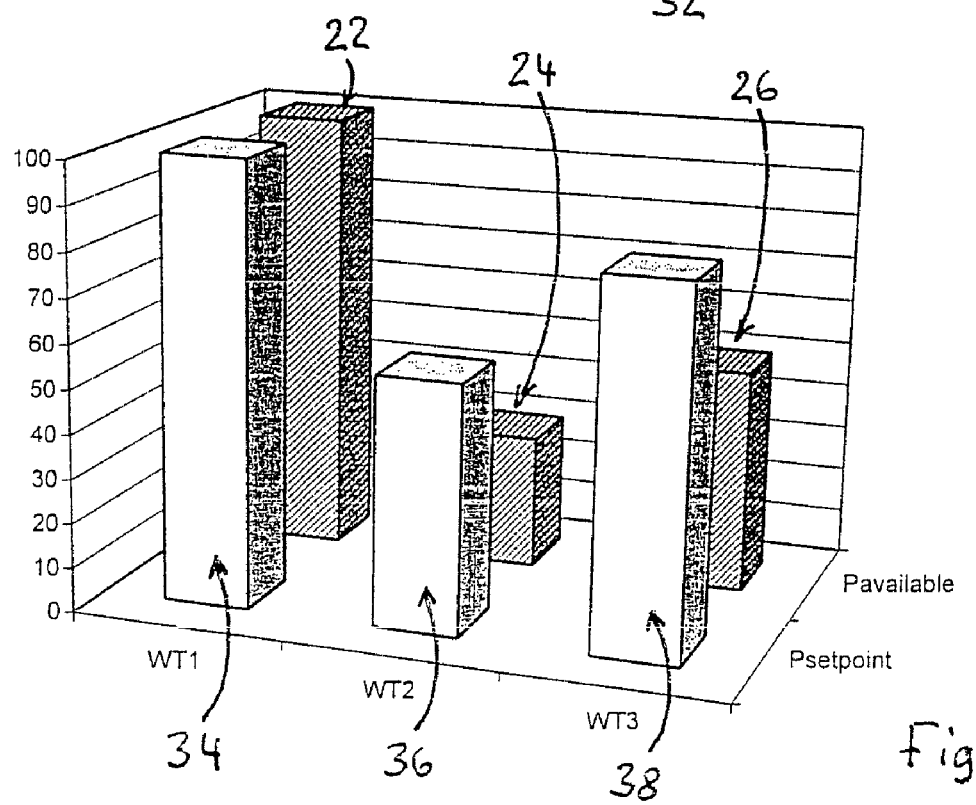
FIG. 3 shows the power distribution for a wind park with a moderate power reduction, wherein one wind energy plant was limited to a limiting value.

In the method according to the present invention, the desired value for the wind energy plant 1 is set to a limiting value. As shown in FIG. 2, the available power in the wind energy plant 1 is column 22, the available power in the wind energy plant 2 is column 24, and the available power in the wind energy plant 3 is column 26. The columns 22, 24 and 26 are each at a time smaller than the associated columns 28, 30 and 32, which show the necessary desired values for the wind energy plants. In FIG. 2 it can also clearly be recognized that the wind energy plant 1 with column 28 gets a desired value of 133 percent.

When the situation occurs that one of the preset desired values is greater than its limiting value, the corresponding desired value is limited to the limiting value. As shown in FIG. 2, the limiting value is assumed to be set to 105 percent (column 34). The remaining power 133%-105%=28% is uniformly distributed to the remaining plants (column 36, 38). Hence, the following desired values result:

$$\hat{P}_{max}^1 = 105\%$$

$$\hat{P}_{max}^2 = 80\% * \frac{30\%}{60\%} + (133\% - 105\%)/2 = 54\%$$

$$\hat{P}_{max}^3 = 80\% * \frac{50\%}{60\%} + (133\% - 105\%)/2 = 71\%$$

In the distribution of the excess power, the same was uniformly distributed to the remaining plants. In principle, it is also possible to distribute the excess power weightedly to the remaining plants again.

The limiting value of 105 percent was arbitrarily selected in the example. In the selection of the limiting value, it is important for the operation of the wind energy plant that the control of the wind energy plant can discriminate between the operation at rated power (=100%) and the operation with the limiting value.

In the present example, a final desired value distribution for the wind energy plants of the wind park results, which permits to react quickly and flexibly to wind fluctuations.

In the operation of the wind park, situations may occur in which a minimum desired value is preset for individual wind energy plants. The minimum desired value prescribes that no lower desired value can be preset for the plant in the operation. In order to set this limiting condition, a subsequent desired value adaptation can be provided, which will be explained by means of an example in the following:

The desired value limitation has to take place with 9.33% for a wind park with three wind energy plants. The individual wind energy plants have 12%, 30% and 36% as the currently available power values. One minimum desired value is assigned to each of the plants, which should not be fallen below in the power distribution. The minimum desired value for the plants is assumed to be 16%, 4% and 4%.

According to the already discussed desired value distribution, the following values result with $$\overline{P}_{max} = \frac{(12\% + 30\% + 36\%)}{3} = 26\%:$$

$$\hat{P}_{max}^1 = 9.33\% * \frac{12\%}{26\%} = 4.31\%$$

$$\hat{P}_{max}^2 = 9.33\% * \frac{30\%}{26\%} = 10.77\%$$

$$\hat{P}_{max}^3 = 9.33\% * \frac{36\%}{26\%} = 12.92\%$$

As can be clearly recognised, a desired value is assigned to the wind energy plant 1 which is smaller than the minimum desired value of 12%. As already done in the limitation to a maximum value, even in the limitation to a minimum desired value, a redistribution of the desired values is now performed. For this purpose, the difference between the currently maximum available value and the desired value $\hat{P}_{max}^1$ calculated at first is determined at first. This value results to be 12%-4.31%=7.69% here. As already done in the limitation to a maximum desired value, the desired value is set to the minimum desired value here and the corresponding difference is subtracted from other desired values, provided that the same are above their minimum desired values. When one of the corrected desired values falls below the corresponding minimum desired value after the subtraction, the procedure is repeated with the remaining wind energy plants. After this redistribution, we have the following values:

$$\hat{P}_{max}^1 = 16\%$$

$$\hat{P}_{max}^2 = 10.77\% - \frac{12\% - 4.31\%}{2} = 6.92\%$$

$$\hat{P}_{max}^3 = 12.92\% - \frac{12\% - 4.31\%}{2} = 9.08\%$$

In the redistribution of the desired values, the same were uniformly distributed to the plants 2 and 3. Alternatively, it is also possible to distribute them weightedly. Further, it has to be noted that in difference to the distribution of the maximum values, only the difference to the currently maximum available power value of the first plant is subtracted, even when the minimum desired value with its 16% is higher than the currently maximum available value with 12%.

The method for the distribution of the power when falling below the minimum desired value which was described above can be performed when the overall available power is greater than the sum of the desired values, as long as the sum of the desired values is smaller than the sum of the minimum powers of the individual wind energy plants.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind park with a plurality of wind energy plants, which each have one control unit, which controls and/or adjusts the wind energy plant in response to a received desired value for an electric variable, the method having the following steps:

a supervisory control calculates and/or receives a currently permitted maximum value for the electric variable which the wind park is allowed to provide, the supervisory control determines a desired value for the electric variable for each wind energy plant and forwards the same to the wind energy plants, characterized in that the supervisory control determines the desired value for the electric variable for each one of the wind energy plants depending on the currently maximum and/or minimum available values for the electric variable of all the wind energy plants, and further wherein the desired value for the electric variable for a wind energy plant is determined as the currently maximum available value of the wind park, divided by the number of the wind energy plants, weighted with the quotient of the currently maximum available value for the electric variable of the wind energy plant and the arithmetic mean of the currently maximum available values for the electric variable of all the wind energy plants.

2. The method according to claim 1, characterized in that the supervisory control determines each desired value of one of the wind energy plants depending on the currently maximum and/or minimum available values of the wind energy plants and the preset currently maximum permitted value for the electric variable.

3. The method according to claim 1, characterized in that the desired values for each wind energy plant are calculated when the currently maximum available value of the wind park is smaller than or equal to the currently maximum permitted value of the wind park.

4. The method according to claim 1, characterized in that the desired values for each wind energy plant are calculated when the currently maximum available value of all the wind energy plants is greater than or equal to the maximum permitted value.

5. The method according to claim 1, characterized in that when the desired value of one of the wind energy plants exceeds a limiting value of this wind energy plant, the desired value for this wind energy plant is limited to the limiting value of this wind energy plant.

6. The method according to claim 5, characterized in that the difference between the not limited desired value and the limiting value is distributed to one or plural remaining wind energy plants.

7. The method according to claim 1, characterized in that a characteristic curve is provided for each one of the wind energy plants, in which the maximum available value of the wind energy plant or of a group of wind energy plants is laid down depending on one or plural external variables.

8. The method according to claim 1, characterized in that the wind velocity and/or the wind direction is/are provided as the external variable.

9. The method according to claim 1, characterized in that the electric variable represents the active power and/or the active current of the wind energy plant.

10. The method according to claim 1, characterized in that the electric variable represents the reactive power and/or the reactive current.

11. The method according to claim 1, characterized in that the electric variable represents the phase angle and/or the power factor.

12. The method according to claim 1, characterized in that the electric variable represents the apparent power and/or the apparent current.

13. The method according to claim 1, characterized in that to at least one of the wind energy plants, a minimum available value is assigned, which is provided as the desired value when the desired value determined by the supervisory control is smaller than the minimum available value.

14. The method according to claim 13, characterized in that when the desired value for at least one wind energy plant is limited to the minimum available value, the desired value of at least one of the other wind energy plants is decreased.

15. A wind park with a plurality of wind energy plants, which each have one control unit, which controls and/or adjusts the wind energy plant in response to a received desired value for an electric variable, wherein the wind park has at least one supervisory control which stores a maximum permitted value for the electric variable provided by the wind park, the supervisory control determines a desired value for the electric variable for each wind energy plant and forward it to the wind energy plant, characterized in that the supervisory control determines each desired value for the wind energy plant depending on the currently maximum and/or minimum available values of the wind energy plants, and further wherein the supervisory control determining the desired value for a wind energy plant as a currently maximum available value of the wind park, divided by the number of the wind energy plants, weighted with a quotient of the currently maximum available value of the wind energy plant and the arithmetic mean of all the currently maximum available values of the wind energy plants.

16. The wind park according to claim 15, characterized in that the supervisory control determines each desired value of one of the wind energy plants depending on the currently maximum available value of the wind energy plant and the preset permitted value for the electric variable.

17. The wind park according to claim 15, characterized in that a characteristic curve is provided for each one of the wind energy plants, in which the maximum available value of the electric variable of the wind energy plant or of a group of wind energy plants is laid down depending on one or plural external variables.

18. The wind park according to claim 15, characterized in that the wind velocity and/or the wind direction is used as the external variable.

19. The wind park according to claim 15, characterized in that the electric variable represents the active power and/or the active current of the wind energy plant.

20. The wind park according to claim 15, characterized in that the electric variable represents the reactive power and/or the reactive current.

21. The wind park according to claim 15, characterized in that the electric variable represents the phase angle and/or the power factor.

22. The wind park according to claim 15, characterized in that the electric variable represents the apparent power and/or the apparent current.

23. The wind park according to claim 15, characterized in that to at least one of the wind energy plants, a minimum available value is assigned, which is provided as the desired value when the desired value determined by the supervisory control is smaller than the minimum available value.

24. The wind park according to claim 23, characterized in that when the desired value for at least one wind energy plant is limited to the minimum available value, the desired value of at least one of the other wind energy plants is decreased.

* * * * *